US 12,307,625 B2

United States Patent
Kempf

(10) Patent No.: US 12,307,625 B2
(45) Date of Patent: May 20, 2025

(54) PARALLELIZED DIGITAL IMAGE WARPING

(71) Applicant: TEXAS INSTRUMENTS INCORPORATED, Dallas, TX (US)

(72) Inventor: Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 379 days.

(21) Appl. No.: 17/987,575

(22) Filed: Nov. 15, 2022

(65) Prior Publication Data
US 2023/0342878 A1  Oct. 26, 2023

Related U.S. Application Data

(60) Provisional application No. 63/333,788, filed on Apr. 22, 2022.

(51) Int. Cl.
G06T 3/18 (2024.01)
G06T 3/4023 (2024.01)

(52) U.S. Cl.
CPC .............. *G06T 3/18* (2024.01); *G06T 3/4023* (2013.01); *G06T 2200/28* (2013.01)

(58) Field of Classification Search
None
See application file for complete search history.

(56) References Cited

U.S. PATENT DOCUMENTS

2017/0178288 A1* 6/2017 Adaszewski .......... G06T 19/006
2017/0193687 A1* 7/2017 Lo ......................... G06T 19/006
2022/0392109 A1* 12/2022 Forutanpour ............. G06T 7/40

* cited by examiner

*Primary Examiner* — Peter Hoang
(74) *Attorney, Agent, or Firm* — Michelle F. Murray; Frank D. Cimino

(57) ABSTRACT

An apparatus includes a parser configured to decimate a source image to produce a decimated image according to a pre-distortion geometry for the source image, and partition the decimated image into image portions according to a first clock rate. The apparatus includes warping engines coupled to the parser and configured to pre-distort, according to a second clock rate, respective image portions to produce respective pre-distorted image portions according to the pre-distortion geometry. The apparatus also includes a combiner coupled to the warping engines and configured to combine the pre-distorted image portions, according to the first clock rate, to form a pre-distorted image of the source image. The apparatus further includes a processor configured to process the pre-distorted image to produce a processed image for projection by a light modulator and one or more light sources.

20 Claims, 7 Drawing Sheets

PARALLELIZED DIGITAL IMAGE WARPING

CROSS-REFERENCE TO RELATED APPLICATIONS

The present application claims priority to U.S. Provisional Patent Application No. 63/333,788, which was filed Apr. 22, 2022, is titled "PARALLELIZED DIGITAL IMAGE WARPING APPARATUS INCORPORATING AN OPTIMIZED PRE-DECIMATION ARCHITECTURE," and is hereby incorporated herein by reference in its entirety.

BACKGROUND

Projection-based displays project images onto projection surfaces, such as onto a wall or a screen, to display video or pictures for viewing. Such displays can include cathode-ray tube (CRT) displays, liquid crystal displays (LCDs), and spatial light modulator (SLM) displays, etc.

SUMMARY

In accordance with at least one example of the disclosure, an apparatus includes a parser configured to receive a source image at a first input, receive a first clock signal having a first clock rate at a second input, partition the source image into image portions according to a pre-distortion geometry for the source image and the first clock rate, and provide the image portions of the source image at respective first outputs. The apparatus also includes warping engines coupled to the respective first outputs and configured to receive the image portions at respective third inputs, receive a second clock signal having a second clock rate at respective fourth inputs, warp the image portions separately to produce respective pre-distorted image portions based on the pre-distortion geometry for the source image and according to the second clock rate, and provide the pre-distorted image portions at respective second outputs. The apparatus also includes a combiner coupled to the second outputs and configured to receive the pre-distorted image portions at respective fifth inputs, receive the first clock signal at a sixth input, combine the pre-distorted image portions to form a pre-distorted image of the source image according to the first clock rate, and provide the pre-distorted image at a third output.

In accordance with at least one example of the disclosure, a method includes decimating, by a parser, a source image to produce a decimated image according to a pre-distortion geometry for the source image; partitioning, by the parser, the decimated image into image portions; and pre-distorting the image portions by respective warping engines to produce respective pre-distorted image portions according to the pre-distortion geometry for the source image. The method further includes combining, by a combiner, the pre-distorted image portions to produce a pre-distorted image; processing, by a processor, the pre-distorted image to produce a processed image for projection; and modulating, by a light modulator, light from one or more light sources to project the processed image.

In accordance with at least one example of the disclosure, a device includes an apparatus, a processor, one or more light sources, and a light modulator. The apparatus includes a parser configured to decimate a source image to produce a decimated image according to a pre-distortion geometry for the source image, and partition the decimated image into image portions. The apparatus also includes warping engines coupled to the parser and configured to pre-distort the image portions to produce respective pre-distorted image portions according to the pre-distortion geometry. The apparatus also includes a combiner coupled to the warping engines and configured to combine the pre-distorted image portions to produce a pre-distorted image. The processor is configured to process the pre-distorted image to produce a processed image for projection. The one or more light sources are coupled to the processor and configured to transmit incident light. The light modulator is coupled to the processor and optically coupled to the one or more light sources, and is configured to modulate the incident light to project a modulate light according to the processed image.

In accordance with at least one example of the disclosure, a device includes a memory configured to store instructions, and a processor coupled to the memory. The instructions cause the processor to be configured to broadcast, a first message that requests to subscribe to a multicast service over a BLE network, receive a unicast message that indicates multicast connection parameters for receiving multicast messages of the multicast service, and receive the multicast messages according to the multicast connection parameters.

DETAILED DESCRIPTION

Figure 1A:
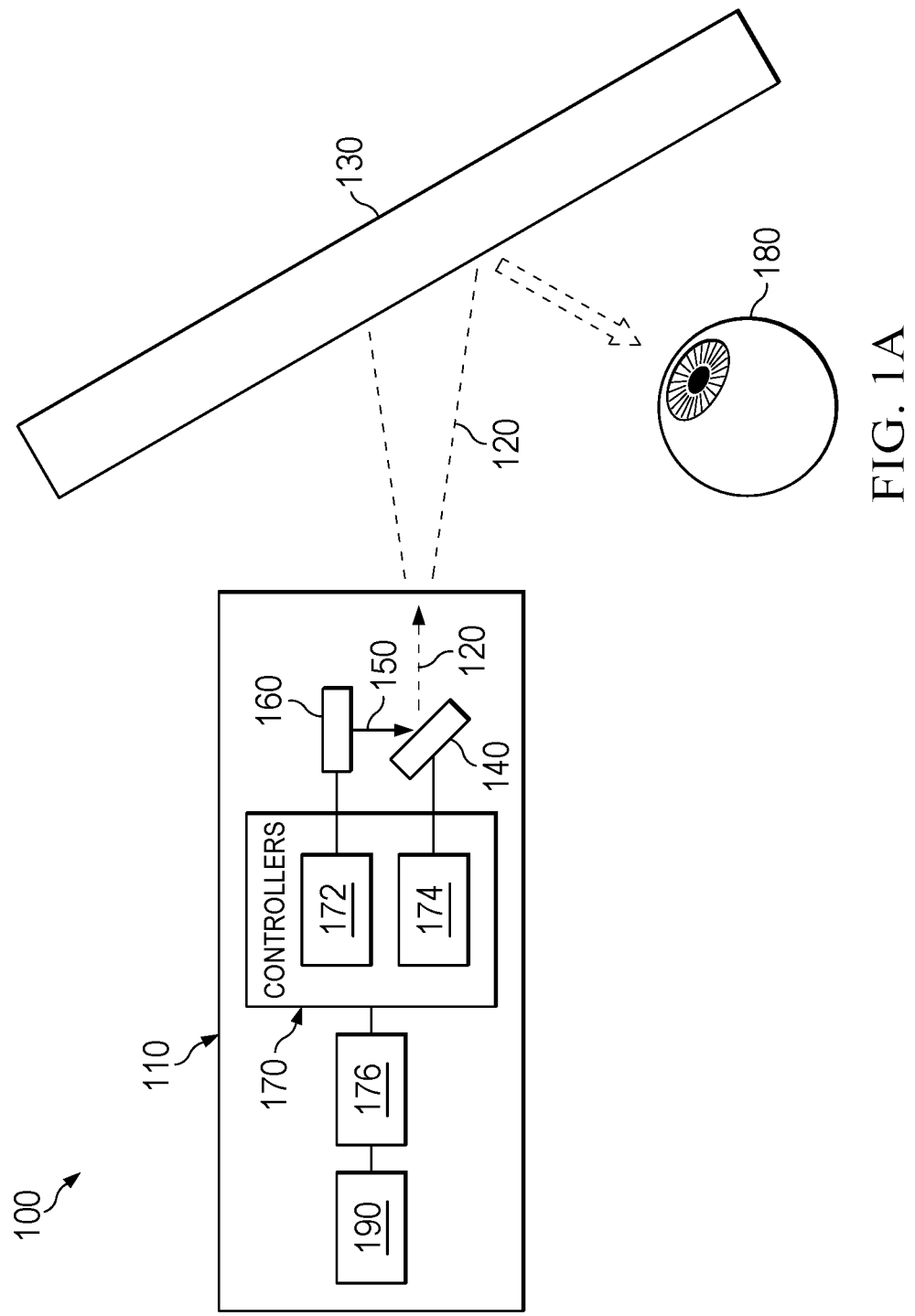
FIG. 1A is a diagram of a display system, in accordance with various examples.

In projection-based displays, distortion in projected images can be caused by projecting the images at an off-axis angle, also referred to herein as off-axis projection. Distortion can also be cause by other factors, such as surface geometry (e.g., a curved screen) or defects in the projection optics (e.g., lateral color distortion, pincushion distortion, barrel distortion, etc.). The distortion can be a geometric distortion where pixels in the image are shifted causing a geometric shape change in the projected image. The image distortion caused by off-axis projection, also referred to as keystone effect, or by other causes of distortion (e.g., surface geometry, defects in projection optics, etc.) can be corrected as part of image processing prior to image projection, such as with digital processing methods. For example, an image processor of a display device can include a warping engine that is configured to correct the image distortion as part of digital image processing. The warping engine warps a source image, which can be in digital format, to obtain a pre-distorted image based on the distortion geometry. Warping the image by the warping engine to obtain a pre-distorted image is also referred to herein as pre-distorting the image. The source image can be pre-distorted by an inverse distortion transform function to mitigate the image distortion. The pre-distorted image can then be projected to display an image with less distortion or without distortion. In examples, the warping engine can be implemented by hardware, such as by an electronic chip. In other examples, the warping engine can be implemented by software that runs on a computer processor, such as by program instructions for a central processing unit (CPU), graphic processing unit (GPU), or the like.

The image projected by a display system or device can be a frame in a video which includes multiple digital image frames that are displayed at a certain rate. The quality of the displayed video can depend on the video frame display rate, also referred to herein as the video rate. To display higher quality digital video with higher image resolution, such as ultra-high definition (UHD) and 8K video, the video frames are processed by processors that operate according to faster clocks to process frames with higher video rates. For example, a digital image of an 8K video may be processed according to clock rates at approximately 2.4 gigahertz (GHz). Processors operating according to faster clocks and processing capabilities can include components with higher integration which have higher cost. For example, electronic chips that operate according to clock rates at 2.5 GHz can include circuit features with 5 nanometer (nm) dimensions.

To reduce the cost of image processors, video frames can be partitioned into smaller image portions that can be processed, concurrently, by separate respective processors. Reducing the image size (e.g., in pixels) by partitioning the image into smaller image portions allows processing images with the same video rate by processors operating according to slower clocks and having lower cost. For example, an image of an 8K video with a video rate of 2.4 GHz can be partitioned into four image portions, also referred to herein as quadrants, which can be processed concurrently by respective processors that operate according to clock rates of 600 megahertz (MHz). Electronic chips that operate according to 600 MHz clock rates can include 16 nm circuit features that have lower cost than electronic chips that operate according to 2.4 GHz clock rates and 5 nm features.

To correct the image distortion for a source image, the image portions of the source image can also be pre-distorted concurrently by respective warping engines that operate according to slower clocks to obtain respective pre-distorted image portions. The processors operating according to slower clocks can also have lower cost. Pre-distorting the image portions of a digital image by respective warping engines concurrently is also referred to herein as parallelized digital image warping. This description includes examples useful for parallelized digital image warping that can be performed with multiple warping engines for a projection-based display. The parallelized digital image warping includes analyzing a warping geometry for mitigating the image distortion to determine the partitioning of the source image into image portions. The warping geometry, also referred to herein as a pre-distortion geometry, is analyzed to determine the image portions in the source image. A pre-distorted image is then obtained for each image portion by a respective warping engine. The pre-distorted image portions are combined to provide a pre-distorted image for projection.

The examples include an apparatus for performing the parallelized digital image warping. The apparatus includes the warping engines for pre-distorting the respective image portions. The apparatus also includes a parser coupled to the warping engines and configured to analyze the pre-distortion geometry to partition the source image into image portions. A combiner coupled to the warping engines is also configured to combine the pre-distorted image portions to provide the pre-distorted image for projection. The apparatus can be part of a device for a projection-based display system. The parser, the warping engines, and the combiner can be implemented by one or more processors on one or more of electronic chips of the projection-based display.

FIG. 1A is a diagram of a display system 100, in accordance with various examples. The display system 100 is a projection-based display that projects images or video for display. As shown in FIG. 1A, the display system 100 includes a display device 110 which is configured to project a modulated light 120 onto an image projection surface 130 for displaying the images or video. For example, the image projection surface 130 can be a wall or a wall mounted screen. In other examples, the image projection surface 130 may be a screen of a heads up display (HUD), a projection surface in a vehicle such as a windshield, an augmented reality (AR) or virtual reality (VR) combiner, a three-dimensional (3D) display screen, or other display surfaces for projection-based display systems.

The modulated light 120 may be modulated by a light modulator 140 in the display device 110 to project images, such as video frames, onto the image projection surface 130. For example, the light modulator 140 can be an electromechanical system (MEMS) based SLM such as a digital mirror device (DMD), or a liquid crystal-based SLM such as an LCD or a liquid crystal on silicon (LCoS) device. The light modulator 140 modulates the intensity of the projected light based on optical elements that are controlled to manipulate the light and accordingly form the pixels of a displayed image. If the light modulator 140 is a DMD, the optical elements are adjustable tilting micromirrors that are tilted by applying voltages to the micromirrors through respective electrodes. The micromirrors are tilted to project dark pixels or bright pixels with color shades. If the light modulator 140 is an LCD or an LCoS device, the optical elements are liquid crystals that are controlled by voltage to modulate the intensity of light across the image pixels. The intensity of light is modulated by applying voltage to the liquid crystals, which reorients the crystals, also referred to herein as switching the crystals, and accordingly controls the amount of light projected per pixel. The optical elements can be a transmissive array of liquid crystal cells such as in an LCD, or a reflective array of liquid crystal cells such as in an LCoS device. The cells of liquid crystals can be controlled by voltages, through respective electrodes, to modulate light.

In other examples, the light modulator 140 can be a phase light modulator (PLM) or a ferroelectric liquid crystal on silicon (FLCoS) device. A PLM can be a MEMS device including micromirrors that have adjustable heights with respect to the PLM surface. The heights of the micromirrors can be adjusted by applying voltages. The micromirrors may be controlled with different voltages to form a diffraction surface on the PLM. For example, each micromirror can be coupled to respective electrodes for applying a voltage and controlling the micromirror independently from the other micromirrors of the PLM. The diffraction surface is a phase altering reflective surface to light incident on the surface of the light modulator 140 from a light source. The phase altering reflective surface represents a hologram for projecting illumination patterns of light that form an image on an image projection surface. The hologram is formed as a diffraction surface by adjusting the heights of the micromirrors of the PLM. The hologram is formed based on an image that is to be displayed by projecting the light on the image projection surface 130. An FLCoS device includes ferroelectric liquid crystals (FLCs) that have a faster voltage response than other liquid crystal devices (e.g., LCDs and LCoS devices) and accordingly can project images at a higher rate. Other examples of the light modulator 140 include micro-light emitting diodes (micro-LEDs) and micro-organic light emitting diodes (micro-OLEDs).

The modulated light 120 can be formed as a combination of color modes (e.g., blue, green, and red) from an incident light 150, which is generated by one or more light sources 160. For example, three color modes can provide three basic color components for displaying an image in full color. The color modes in the incident light 150 can be transmitted concurrently or by time multiplexing the light sources 160. The incident light 150 with the different color modes is modulated by the light modulator 140 in the display device 110 to produce the modulated light 120 for displaying images or video on the image projection surface 130.

The display device 110 also includes one or more controllers 170 configured to control the light modulator 140 and the light sources 160 to display the images or video. For example, the controllers 170 can include a first controller 172 for controlling the light sources 160 to transmit the incident light 150 concurrently or consecutively by time multiplexing. The controllers 170 can also include a second controller 174 for controlling the light modulator 140 to modulate the incident light 150 from the respective light sources 160. The display device 110 also includes a processor 176 configured to process an image and produce a processed image for projection. The processed image can be a digital image, which is useful to provide control signals from the controllers 170 to the light modulator 140 and the light sources 160. The light modulator 140 is configured to project the modulated light 120 on the image projection surface 130 to display the image for viewing by a human eye 180, also referred to herein as the human visual system (HVS) pupil. The display device 110 can further include one or more input/output devices (not shown), such as an audio input/output device, a key input device, a display, and the like.

The first controller 172 and the second controller 174 can be different controllers. The first controller 172 can be a digital controller configured to switch the light sources 160 on and off. In other examples, the first controller 172 can be an analog controller that changes the level of light intensity of the incident light 150 from the light sources 160. The analog controller can also transmit pulse width modulation (PWM) signals to the light modulator 140 to synchronize the adjustment of the optical elements in the light modulator 140 with the transmission of the incident light 150 from the light sources 160. The second controller 174 may be an analog or a digital controller that switches the optical elements of the light modulator 140. For example, the second controller 174 is an analog controller or a digital controller that switches the angles of micromirrors of an SLM or the heights of micromirrors of a PLM. In examples, the second controller 174 is a digital controller coupled to a static random access memory (SRAM) (not shown) including an array of memory cells each configured to store voltage values, such as in bits, to adjust respective micromirrors of an SLM or a PLM. The micromirrors can be adjusted according to the bit values in the corresponding SRAM cells, such as based on PWM signals from the first controller 172. In other examples, the light modulator 140 is an LCD, an LCoS device, or a FLCoS device and the optical elements are liquid crystals that are controlled by the second controller 174 to modulate the incident light 150 across the image pixels.

In examples, the display device 110 also includes an apparatus 190 which is configured to correct the image distortion by parallelized digital image warping. The apparatus 190 can be coupled to the processor 176. In other examples, the apparatus 190 can be part of the processor 176. For example, the apparatus 190 includes one or more electronic chips coupled to or integrated with the processor 176.

Figure 1B:
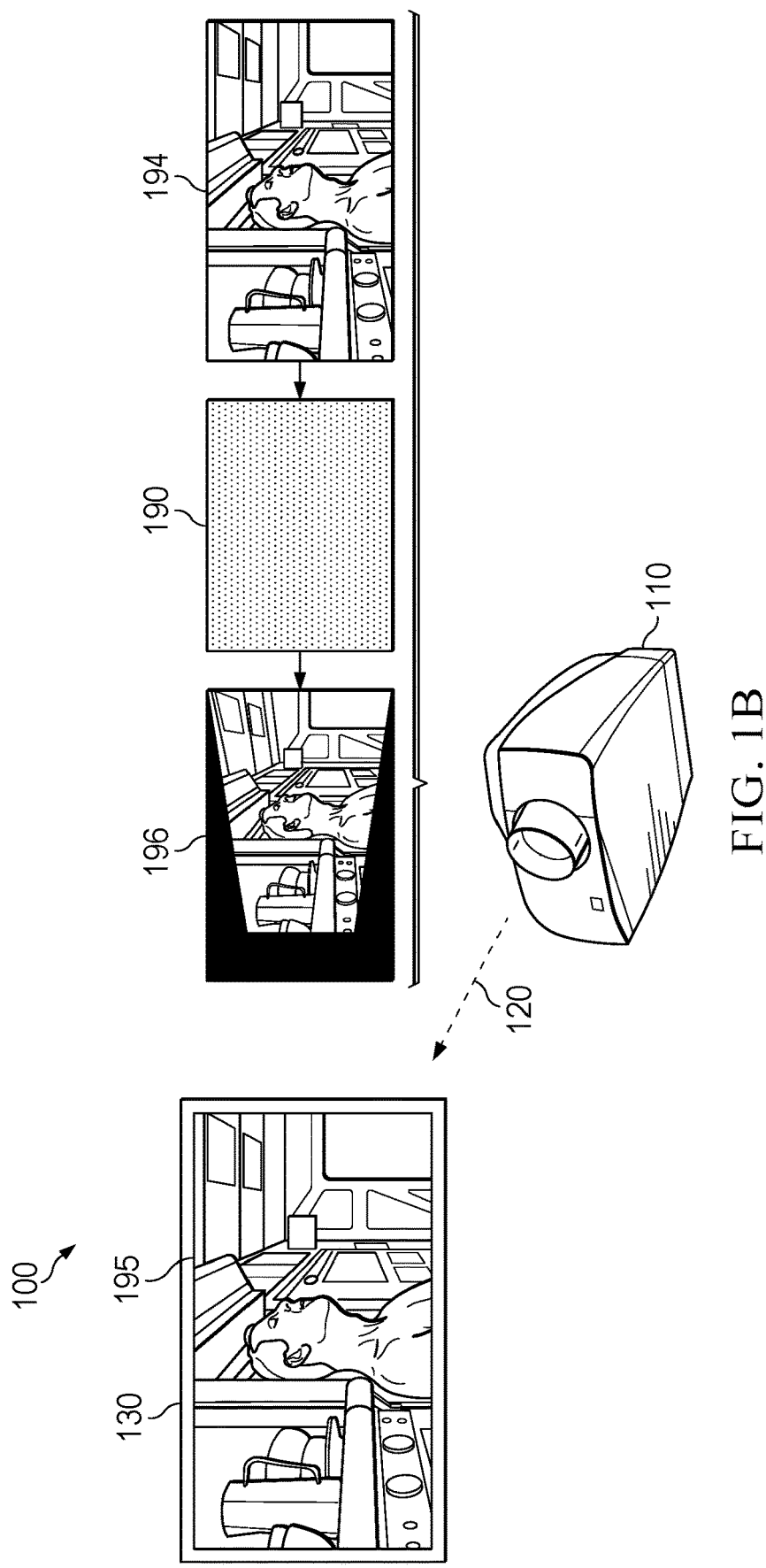
FIG. 1B is a diagram of image projection in the display system of FIG. 1A, in accordance with various examples.

FIG. 1B is a diagram of image projection in the display system 100. As shown in FIG. 1, the display device 110 can be a projector configured to project the modulated light 120 to display a source image 194, such as a video frame, on the image projection surface 130 (e.g., a wall or a viewing screen). The source image 194 can be a digital image that is processed by the processor 176 to send control signals to the controllers 170, which control the light modulator 140 and the one or more light sources 160 to project a displayed image 195 on the image projection surface 130. The shape or geometry of the displayed image 195 can be affected by the projection angle of the modulated light 120 from the display device 110 with respect to the image projection surface 130. For example, if the projection of the modulated light 120 from the display device 110 is at an angle that is off the orthogonal angle with respect to the surface of the image projection surface 130, also referred to herein as off-axis projection, the displayed image 195 can be distorted (e.g., skewed). The display device 110 includes an apparatus 190 which is configured to correct the off-axis distortion by parallelized digital image warping.

The apparatus 190 is configured to pre-distort the source image 194 to produce a pre-distorted image 196. The pre-distorted image 196 can be produced by processing the source image 194 with an inverse distortion transform function, such as based on the off-axis projection angle, to mitigate the off-axis distortion. Accordingly, projecting the pre-distorted image 196 cancels or mitigates the off-axis distortion in the displayed image 195. Similarly, the apparatus 190 can also correct by parallelized digital image warping other image distortions that can be caused by other factors, such as surface geometry or defects in the projection optics of the display system 100.

The apparatus 190 is configured to partition the source image 194 into image portions which can be pre-distorted concurrently by respective warping engines of the apparatus 190 to produce respective pre-distorted image portions. The pre-distorted image portions are then combined to form the pre-distorted image 196. If the image is a video frame displayed at a certain video rate, partitioning the source image 194 into image portions of a smaller size (e.g., with fewer pixels) allows pre-distorting the image portions by warping engines operating according to slower clocks and having lower cost in comparison to pre-distorting the source image 194. The warping engines can be separate electronic chips or integrated into the same electronic component.

Figure 2:
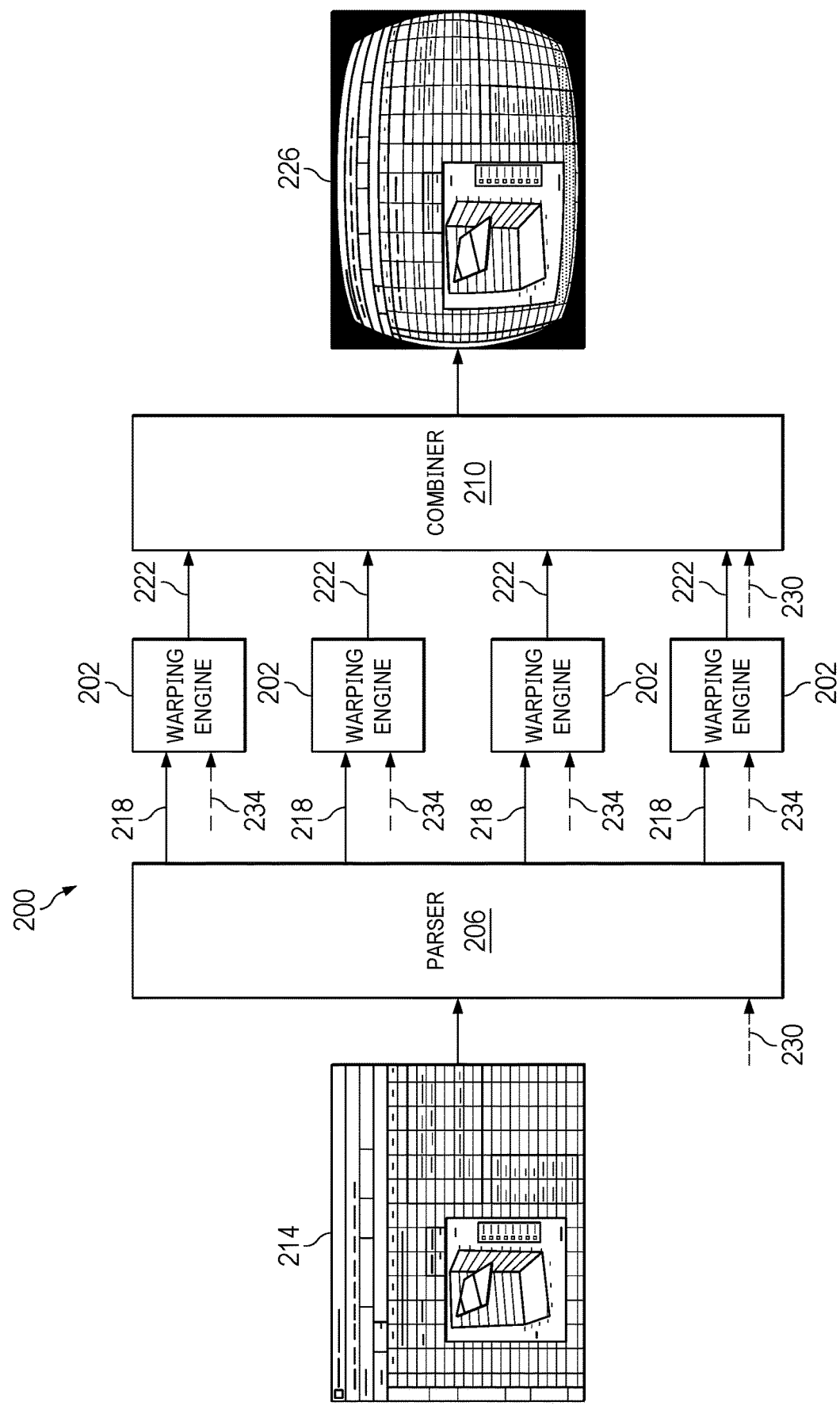
FIG. 2 is a diagram of an apparatus for parallelized digital image warping, in accordance with various examples.

FIG. 2 is a diagram of an apparatus 200 for parallelized digital image warping, in accordance with various examples. The apparatus 200 can be part of a display device configured for image projection. For example, the apparatus 200 is an example of the apparatus 190 of the display device 110. The apparatus 200 is configured to correct distortion in images (e.g., off-axis distortion, distortion caused by surface geometry, distortion caused by projection optics, etc.), such as part of digital image processing to project and display images or video. The apparatus 200 includes warping engines 202, a parser 206, and a combiner 210. The warping engines 202, the parser 206, and the combiner 210 are configured to pre-distort one or multiple source images 214, such as frames of a video that are processed for projection on a screen or a projection surface according to a video rate.

In examples, the warping engines 202, the parser 206, and the combiner 210 can be implemented by hardware. For example, the warping engines 202, the parser 206, and the combiner 210 can be implemented by respective electronic chips or can be integrated into one or more electronic chips, such as a processor. The electronic chips can be configured to perform digital signal processing functions of the warping engines 202, the parser 206, and the combiner 210 to process digital images for parallelized digital image warping. In other examples, the warping engines 202, the parser 206, and the combiner 210 can be implemented in the form of firmware on one or more electronic chips. In further examples, the warping engines 202, the parser 206, and the combiner 210 can be implemented by software that runs on a computer processor (e.g., a CPU or GPU).

As shown in FIG. 2, the warping engines 202 are coupled in parallel to the parser 206. The parser 206 is configured to receive, at an input, and partition each source image 214 into image portions 218 based on analyzing a pre-distortion geometry for pre-distorting the source image 214. The pre-distorted geometry is the geometry of an inverse distortion transform function that can be calculated to mitigate image distortion. For example, if distortion is caused by off-axis projection, the pre-distorted geometry of the inverse distortion transform function can be calculated based on the off-axis projection angle of the display device 110, as described below. Each image portion 218 is sent, at a respective output, from the parser 206 to one of the warping engines 202. The image portions 218 of the source image 214 can be sent from the parser 206 to the warping engines 202 concurrently.

Each warping engine 202 is configured to receive, at an input, and process one of the image portions 218 to obtain a respective pre-distorted image portion 222. A warping engine 202 is an image processor configured to digitally change an input image (e.g., a respective image portion 218) by changing the bit values in the image pixels to distort shapes portrayed in the input image. The input image can be changed by a mathematical transformation which maps positions (e.g., pixels) in the image plane to positions in a pre-distorted image plane. The transformation can be implemented by one or more two-dimensional functions, which translate the bit value at any position in the image (e.g., a pixel) to a respective position in the pre-distorted image. In examples, the warping engines 202 can be implemented by hardware (e.g., on a chip), software that runs on hardware, or both.

The warping engines 202 can process, concurrently, the respective image portions 218 to produce respective pre-distorted image portions 222. For example, if distortion is caused by off-axis projection, the warping engines 202 pre-distort the respective image portions 218 based on off-axis projection of the display device. Each warping engine 202 can process the received image portion 218 by an inverse distortion transform function, such as based on the off-axis projection angle, to produce a pre-distorted image portion 222. The warping engines 202 can send respectively, at respective outputs, the pre-distorted images portions 222 to the combiner 210.

The inverse distortion transform function can be determined based on the data (e.g., pixels) of a sample image and a respective distorted image that is displayed on the image projection surface 130. For example, if distortion is caused by off-axis projection, the sample image is projected by the display device 110 at a known off-axis projection angle without processing the sample image by a warping engine 202. The off-axis projection angle can be obtained based on the positioning of the display device 110 with respect to the image projection surface 130. Accordingly, the distorted image is displayed with off-axis distortion. The off-axis distortion in the distorted image is useful to calculate the inverse distortion transform function, such as based on a linear or non-linear inverse problem calculation method. According to the linear or non-linear inverse problem calculation method, a distortion function which converts the sample image to the distorted image based on the off-axis projection angle can be estimated. The inverse distortion transform function is then calculated as the mathematical inverse function of the distortion function.

The combiner 210 is also coupled to the warping engines 202 in parallel. The combiner 210 is configured to receive, at respective inputs, and combine the pre-distorted image portions 222 to provide a pre-distorted image 226 for projection. For example, the combiner 210 can produce the pre-distorted image 226 by stitching the pre-distorted image portions 222 to form a complete image. The pre-distorted image 226 can then be projected to display the source image 214 without image distortion. For example, if the apparatus is an example of the apparatus 190 of the display device 110, the pre-distorted image 226 can be sent, at an output of the combiner 210, to the processor 176 or the controllers 170 which control the light modulator 140 and the light sources 160 to project the pre-distorted image 226.

In the apparatus 200, the number of warping engines 202 can be equal to the number of image portions 218, where each warping engine 202 receives and processes one of the image portions 218 of the source image 214. The image portions 218 can have an equal size (e.g., in pixels), which is a portion of the size of the source image 214. The clock rate of the warping engines 202 for processing the image portions 218 can be lower than the clock rate of the parser 206, such as based on the number of image portions 218 or the warping engines 202. For example, the warping engines 202 can operate according to a reduced clock rate in comparison to the parser 206. The reduction in the clock rate can be on the order of times equal to the number of warping engines 202. The clock rate of the parser 206 can be determined by a first clock signal 230 that is received at a respective input of the parser 206, and the clock rate of the warping engines 202 can be determined by a second clock signal 234 that is received at an input of each warping engine 202. Reducing the clock rate of the warping engines 202 to process image portions 218 smaller in size than the source image 214 reduces the cost of the electronic chips in the apparatus 200. The combiner 210 can then combine the pre-distorted image portion 222 to obtain the pre-distorted image 226 at the same size as the source image 214. The clock rate of the combiner 210 can also be determined by the first clock signal 230, which may be received at an input of the combiner 210.

In examples, the source image 214 can be partitioned into four image portions 218 (e.g., quadrants), and the apparatus 200 can include four warping engines 202, as shown in FIG. 2. For example, the source image 214 may be a frame of an 8K video with a size of 7680×4320 pixels. The 8K video frame can be processed according to a clock rate of 2.4 GHz. By comparison, a frame of a 4K video, also called UHD for short, has a size of 3840×2160 pixels and can be processed according to a clock rate of 600 MHz. Accordingly, the parser 206 can partition the source image 214 of an 8K video, according to the clock rate of 2.4 GHz, to obtain four image portions 218 with a size of 3840×2160 pixels. Each image portion 218 can then be processed by a respective warping engine 202 at a clock rate of 600 MHz to produce a respective pre-distorted image portion 222. The combiner 210 can then combine the pre-distorted image portions 222, according to the clock rate of 2.4 GHz, to produce the pre-distorted image 226 at the same size of the source image 214. In other examples, the apparatus 200 includes any integer number N of warping engines, and the source image 214 is partitioned into N image portions 218 that have a total size (e.g., in pixels) approximately equal to the source image 214. Accordingly, if the clock rate for processing the video frame is X gigahertz, each image portion 218 can be processed by the respective warping engine 202 at a clock rate of X/N megahertz, where X is a positive number. For example, N can be equal to 2, 4, 6, 8 or a higher integer number. In other examples, N can be an odd integer number, such as 3, 5, 7 or a higher integer number.

In further examples, image distortion is caused by factors other than off-axis projection. For example, if distortion is caused by the surface geometry of the image projection surface 130, the warping engines 202 can pre-distort the respective image portions 218 based on this surface geometry. Each warping engine 202 can process the received image portion 218 by an inverse distortion transform function that is based on the surface geometry. The inverse distortion transform function associated with the surface geometry can be determined based on a sample image and a respective distorted image that is displayed on the image projection surface 130. For example, the inverse distortion transform function can be calculated from the distorted image based on a linear or non-linear inverse problem calculation method. The warping engines 202 then send respectively, at respective outputs, the pre-distorted images portions 222 to the combiner 210.

Figure 3A:
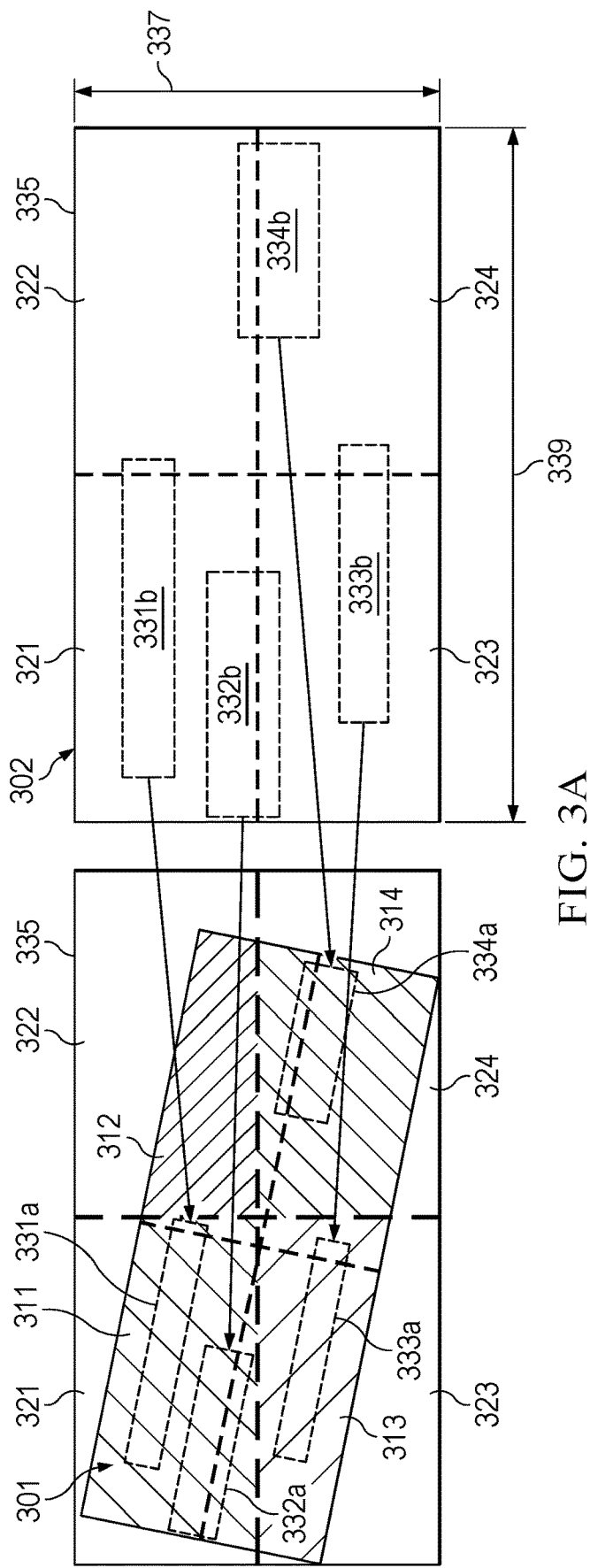
FIG. 3A is a diagram of a pre-distortion geometry for a source image, in accordance with various examples.

FIG. 3A is a diagram of a pre-distortion geometry 301 for a source image 302, in accordance with various examples. For example, as shown in FIG. 3A, the pre-distortion geometry 301 can be a distorted (e.g., skewed) and tilted geometry with respect to the rectangle shape of the source image 302. The image distortion can be caused by off-axis projection angle, the surface geometry of the image projection surface 130, defects in the optics of the system, or other factors. The pre-distortion geometry 301 is useful for partitioning the source image 302 for parallelized digital image warping in a display device. For example, the parser 206 of the apparatus 200 can partition the source image 302 into image portions based on analyzing the pre-distortion geometry 301.

In the example of FIG. 3A, the pre-distortion geometry 301 includes four geometric areas 311 to 314 in respective quadrants 321 to 324 that form the image area 335. The image area 335 represents a maximum number of pixels of the source image 302 which can be projected by the display device. For example, the number of pixels of the image area 335 is determined by the surface area of the light modulator 140 in the display device 110, such as according to the number of micromirrors of an SLM or the number of liquid crystal cells of an LCoS device. Because the pre-distortion geometry 301 does not match the geometry of the source image 302, the geometric areas 311 to 314 in the respective quadrants 321 to 324 are not equal portions (or quadrants) of the source image 302. Accordingly, the geometric areas 311 to 314 of the pre-distortion geometry 301 can include pixels across more than one of the quadrants 321 to 324, also referred to herein as spatial translation between quadrants.

For example, if the source image 302 is partitioned into the quadrants 321 to 324, the region 331a in the geometric area 311 of the pre-distortion geometry 301 includes pixels from the region 331b of the source image 302 that extends between the quadrants 321 and 322. The region 332a in the geometric area 311 includes pixels from the region 332b of the source image 302 that extends between the quadrants 321 and 323. The region 333a in the geometric area 313 includes pixels from the region 333b of the source image 302 that extends between the quadrants 323 and 324. The region 334a in the geometric area 314 includes pixels from the region 334b of the source image 302 that extends between the quadrants 322 and 324.

Because in parallelized digital image warping the pre-distortion of each image portion of the source image 302 is performed separately by a respective warping engine, each image portion includes all the pixels processed by each warping engine to produce the respective pre-distorted image portion. Accordingly, the quadrants 321 to 324 of the image area 335 are not selected as the image portions of the source image 302 based on the analysis of the pixels in the geometric areas 311 to 314 which includes spatial translation between quadrants. To provide equal size image portions that include all the pixels to be processed for pre-distortion by each warping engine, the source image 302 can be scaled to produce image portions that include all such pixels in the respective geometric areas 311 to 314. The process of scaling the source image 302 according to the pre-distortion geometry 301 is also referred to herein as image decimation. Decimating the source image 302 includes reducing the height 337 and width 339, such as by reducing the number of pixels, of the source image 302 in the image area 335 to produce a decimated image.

Figure 3B:
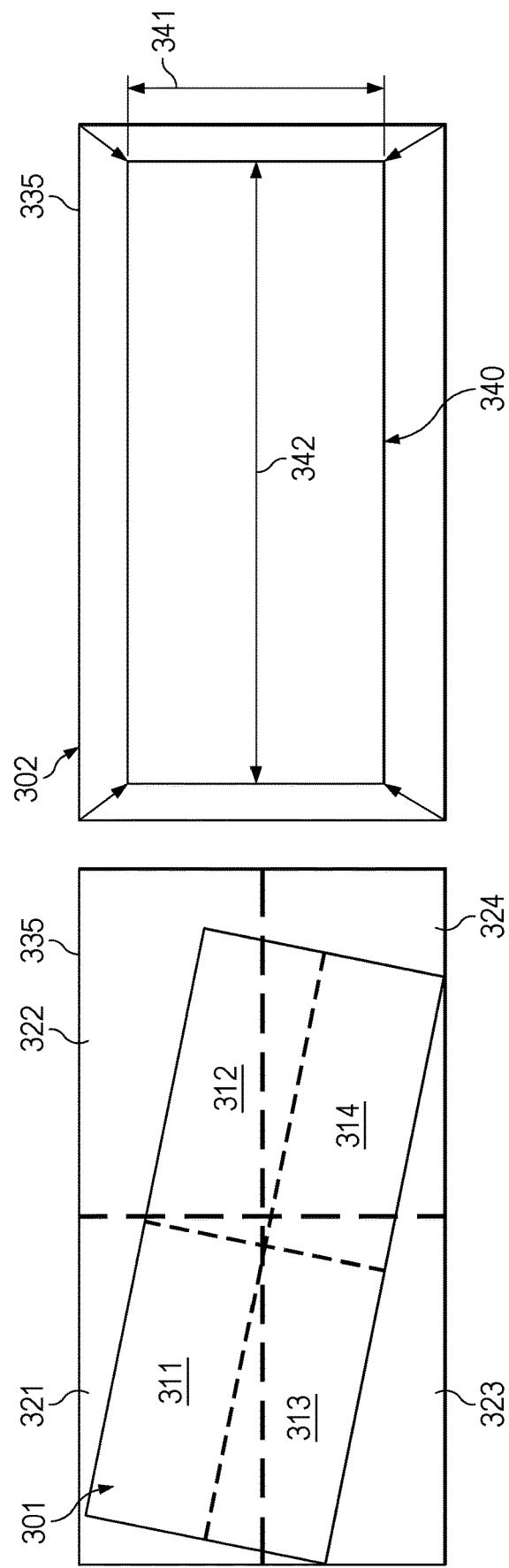
FIG. 3B is a diagram of a decimation of the source image of FIG. 3A, in accordance with various examples.

FIG. 3B is a diagram of a decimation of the source image 302 of FIG. 3A, in accordance with various examples. As shown in FIG. 3B, the source image 302 is decimated to obtain a decimated image 340. The size of the decimated image 340 is based on the pre-distortion geometry 301 within the image area 335. The decimated image 340 can have a smaller size than the source image 302. The decimated image 340 is obtained by reducing the height 337 and width 339 of the source image 302 to a height 341 and a width 342, respectively, to accommodate the spatial translation between the quadrants 321 to 324. For example, the parser 206 of the apparatus 200 can perform horizontal and vertical decimation of the source image 302 to obtain the decimated image 340 before partitioning the decimated image 340 into image portions that include all the pixels to be processed for pre-distortion by the warping engines 202 separately.

To obtain the decimated image 340, horizontal and vertical decimation of the source image 302 can be performed separately and an order, such as in separate decimation steps. In a vertical decimation step, a vertical dimension which is the height 337 of the source image 302 is reduced, by reducing the number of pixels in the vertical direction, to obtain the height 341 of the decimated image 340. Accordingly, a vertically decimated image in the vertical direction of the source image 302 is obtained. To perform vertical decimation, a vertical decimation factor can be calculated for each quadrant 321 to 324 based on the pre-distortion geometry 301 in the image area 335. To calculate the vertical decimation factor for each quadrant 321 to 324, the maximum observed height of the pre-distortion geometry 301 in each quadrant 321 to 324 is estimated. A percentage of the maximum observed height to the total height of the pre-distortion geometry 301 in each quadrant 321 to 324 can be estimated graphically, such as by calculating a ratio of the number of pixels for the maximum observed height to the number of pixels for the total height. In the example shown in FIG. 3B, the maximum observed height of the pre-distortion geometry 301 in the quadrant 321 is estimated at approximately 80 percent (%) of the total height. The value of 80% represents a ratio of the number of pixels for the maximum observed height of the pre-distortion geometry 301 in the quadrant 321 to the number of pixels for the total height of the pre-distortion geometry 301. Similarly, the maximum observed heights of the pre-distortion geometry 301 in the quadrants 322, 323, and 323 are estimated at approximately 48%, 25%, and 85%, respectively, of the total height.

The vertical decimation factor is then calculated as the ratio of a percentage of the height of the source image 302 in each quadrant 321 to 324 to the estimated percentage of the maximum observed height to the total height of the pre-distortion geometry 301 in each respective quadrant. Because the quadrants 321 to 324 are of equal size (as shown in FIG. 3B), the percentage of the height of the source image 302 is equal to 50% for each of the quadrants 321 to 324. Accordingly, the vertical decimation factors for the quadrants 321 to 324 are equal to approximately 0.625 (e.g., 50% divided by 80%), 1.042 (e.g., 50% divided by 48%), 2.0 (e.g., 50% divided by 25%), and 0.588 (e.g., 50% divided by 85%), respectively. The minimum vertical decimation factor for the quadrants 321 to 324, which is approximately 0.588, is selected to perform the vertical decimation of the source image 302 and accordingly provide a vertically decimated image. Selecting the minimum vertical decimation factor ensures observing the maximum height of the of the pre-distortion geometry 301 in all the quadrants 321 to 324. For example, in the example shown in FIG. 3B, the maximum observed height in the pre-distortion geometry 301 is estimated at 85% (in the quadrant 324) of the total height, which can be accounted for by the minimum vertical decimation of approximately 0.588. Decimating the source image 302 by this minimum vertical decimation also accounts for the smaller observed heights in the quadrants 321 to 324.

In a horizontal decimation step, a horizontal dimension which is the width 339 of the source image 302 is reduced, by reducing the number of pixels in the horizontal direction, to obtain the width 342 of the decimated image 340. For example, the horizontal decimation step is performed on the vertically decimated image from the vertical decimation step to produce the decimated image 340. The vertical and horizontal decimation steps can be performed in any order. To perform horizontal decimation, a horizontal decimation factor can also be calculated for each quadrant 321 to 324 based on the pre-distortion geometry 301 in the image area 335. To calculate the horizontal decimation factor for each quadrant 321 to 324, a maximum percentage in width of the source image 302 that can be observed in each of the respective geometric areas 311 to 314 is determined. For example, in FIG. 3, the maximum percentage in width of the source image 302 that can be observed in each of the geometric areas 311 to 314 can be estimated as approximately 55%, 50%, 60%, and 47%, respectively. The horizontal decimation factor is then calculated as the ratio of the width of the source image 302 in each quadrant 321 to 324, which is 0.5, to the observed maximum percentage in width in each respective geometric area 311 to 314. According, the horizontal decimation factors for the quadrants 321 to 324 are equal to approximately 0.909, 1.0, 0.833, and 1.11, respectively. The minimum horizontal decimation factor for the quadrants 321 to 324, which is approximately 0.833, is then selected to perform the horizontal decimation of the source image 302 and accordingly provide a horizontally decimated image.

Figure 3C:
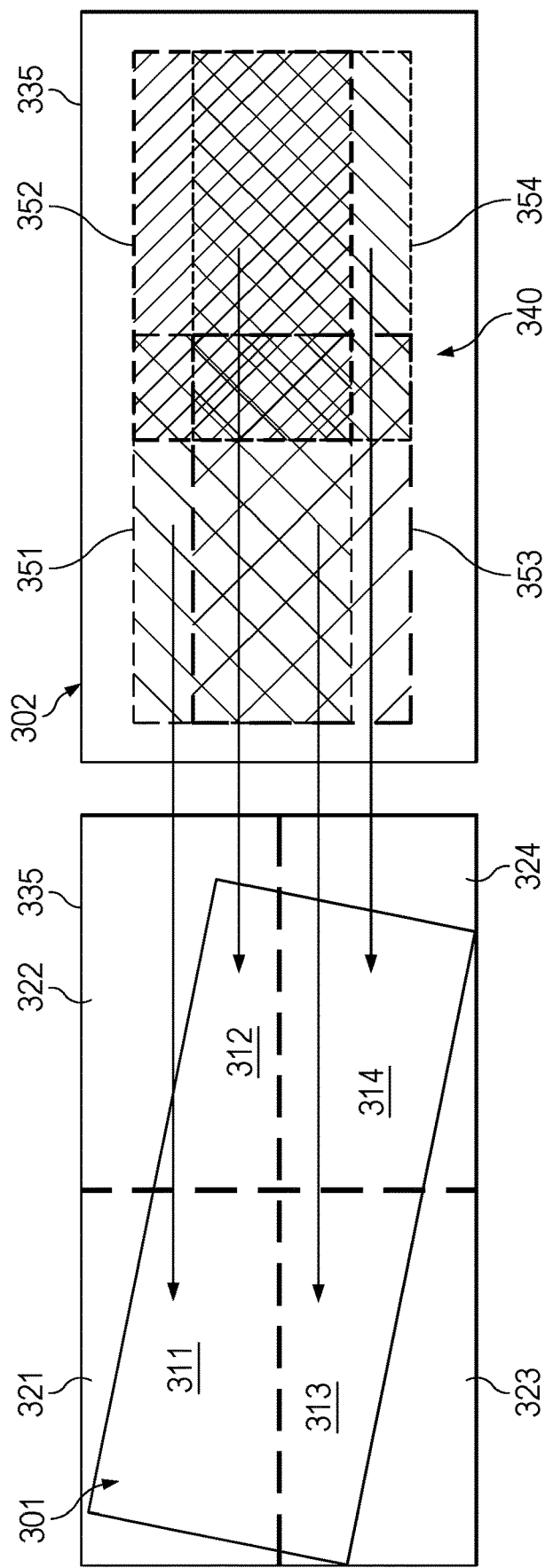
FIG. 3C is a diagram of a partitioning of the source image of FIG. 3A to obtain image portions, in accordance with various examples.

FIG. 3C is a partitioning of the source image 302 of FIG. 3A, in accordance with various examples. As shown in FIG. 3C, the decimated image 340 of the source image 302 is partitioned to obtain four image portions 351 to 354 that can partially overlap within the image area 335. The size of each image portion 351 to 354 is set equal to a quadrant size of the source image 302, which is the same size of the quadrants 321 to 324 with the same height and width. To cover all the pixels in the decimated image 340 by the four image portions 351 to 354, each image portion 351 to 354 extends from a respective corner of the decimated image 340. For example, the image portions 351 to 354 extend from the top left corner, the top right corner, the bottom left corner, and the bottom right corner, respectively, of the decimated image 340. As shown in FIG. 3C, the image portions can be overlapping quadrants, with overlapping pixels, of the decimated image 340. Because the decimated image 340 is obtained from the source image 302 based on the pre-distortion geometry 301, the pixels of the geometric areas 311 to 314 in the respective quadrants 321 to 324 are mapped one-to-one to the pixels of the respective image portions 351 to 354, which partially overlap. For example, the pixels in the geometric area 311 of the pre-distortion geometry 301 can be mapped one-to-one to the pixels in the image portion 351 of the decimated image 340. Similarly, the pixels in the geometric area 312 of the pre-distortion geometry 301 can be mapped one-ot-one to the pixels in the image portion 352 of the decimated image 340. The pixels in the geometric area 313 and the geometric area 314 of the pre-distortion geometry 301 can also be mapped one-to-one the pixels in the image portion 353 and the image portion 354, respectively, of the decimated image 340.

Each of the image portions 351 to 354 can be sent to a respective engine for pre-distortion. For example, the warping engines 202 can receive the image portions 351 to 354, respectively, and pre-distort the image portions concurrently to produce pre-distorted image portions for projection. In other examples, the source image 302 can be partitioned into image portions that have a different shape or geometry than the quadrants 321 to 324. For example, the source image 302 can be partitioned into vertical stripes, horizontal stripes, rectangle patches, or square patches. Since the size of each image portion 351 to 354, and accordingly the respective pre-distorted image portion, is equal to a quadrant size of the source image 302, combining the pre-distorted image portions, by the combiner 210, provides a pre-distorted image equal in size to the source image 302.

Figure 4:
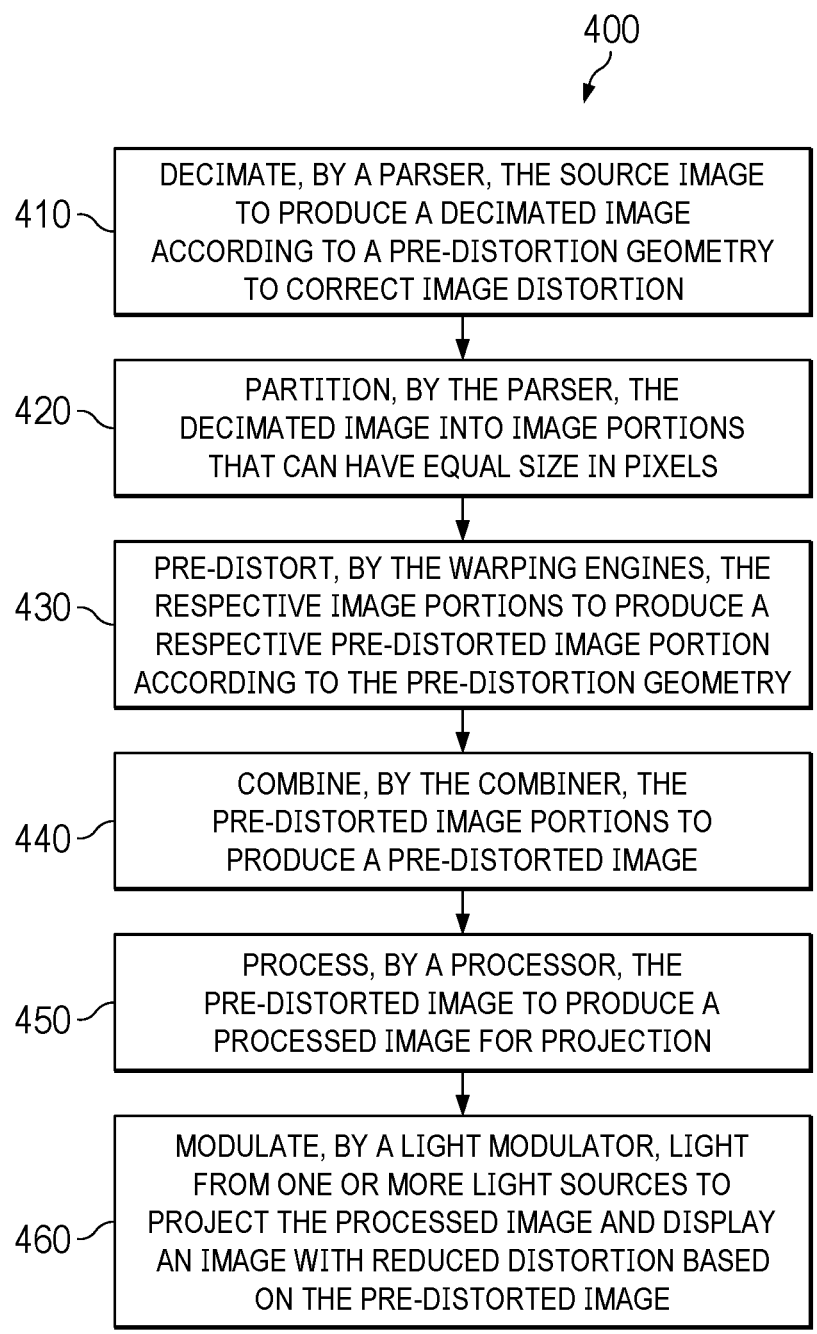
FIG. 4 is a flow diagram of a method for parallelized digital image warping, in accordance with various examples.

FIG. 4 is a flow diagram of a method 400 for parallelized digital image warping, in accordance with various examples. The method 400 can be performed by the apparatus 200 or the apparatus 190 of the display device 110 to process a source image to produce a pre-distorted image that can be projected and displayed without or with reduced image distortion. In examples, the method 400 is performed by a processor (e.g., processor 176) as part of digital image processing for a projection-based display. At step 410, the source image is decimated, by a parser, to produce a decimated image according to a pre-distortion geometry to correct image distortion. For example, the parser 206 decimates the source image 302 based on the pre-distortion geometry 301 to obtain the decimated image 340. In examples, the source image is decimated by separate vertical and horizontal decimation steps.

Vertical decimation is useful to reduce a vertical dimension (e.g., the height) of the source image. Horizontal decimation is useful to reduce a horizontal dimension (e.g., the width) of the source image. In the vertical decimation step, the maximum observed height of the pre-distortion geometry 301 is estimated in each quadrant 321 to 324 of the source image 302. The vertical decimation factor is then calculated based on the maximum observed height of the pre-distortion geometry 301 in each quadrant 321 to 324, and the minimum vertical decimation factor is selected to perform the vertical decimation of the source image 302 and provide a vertically decimated image. In the horizontal decimation step, the maximum observed width of the pre-distortion geometry 301 is estimated in each quadrant 321 to 324 of the source image 302. The horizontal decimation factor is then calculated based on the maximum observed width of the pre-distortion geometry 301 in each quadrant 321 to 324, and the minimum horizontal decimation factor is selected to perform the horizontal decimation of the source image 302 and provide a horizontally decimated image.

At step 420, the decimated image is partitioned, by the parser, into image portions that can have equal size in pixels. The number of image portions can be related to the number of warping engines of the parallelized digital image warping apparatus. In examples, the number of image portions is equal to the number of warping engines. For example, the parsers 206 partitions the decimated image 340 into the four image portions 351 to 354 and sends each of the image portions to one of the warping engines 202 of the apparatus 200. If the source image 302 is a frame in an 8K vide, the source image 302 can be decimated and then partitioned by the parser 206 at a clock rate of 2.5 GHz. At step 430, the warping engines pre-distort the respective image portions to produce a respective pre-distorted image portion according to the pre-distortion geometry. The warping engines can process the image portions concurrently to provide the respective pre-distorted image portions. Each warping engine is also configured to pre-distort a respective image portion separately from the other warping engines and independent of pixels in the other image portions. For example, the warping engines 202 can pre-distort, concurrently, the image portions 351 to 354 at equal clock rates of 600 MHz to produce respective pre-distorted image portions.

At step 440, the pre-distorted image portions are combined, by a combiner, to produce a pre-distorted image. For example, the combiner 210 can combine the pre-distorted image portions from the warping engines 202 by stitching the image portions to produce a pre-distorted image. The combiner 210 can combine the pre-distorted images at the same clock rate of the parser 206. Stitching, in the pre-distorted image, the image portions includes positioning each image portion in a respective quadrant that extends from a respective corner of the pre-distorted image. Accordingly, the pixels along the internal two edges of each quadrant are placed next to the pixels along two adjacent internal edges, respectively, of two adjacent quadrants without overlap or loss of pixels. For example, in the pre-distorted image, the pixels along a right edge of the pre-distorted image portion obtained from the image portions 351 are placed next to the pixels along a left edge of the pre-distorted image portion obtained from the image portions 352. The pixels along a bottom edge of the pre-distorted image portion obtained from the image portions 351 are placed next to the pixels along a top edge of the pre-distorted image portion obtained from the image portions 353. The pixels along a bottom edge of the pre-distorted image portion obtained from the image portions 352 are placed next to the pixels along a top edge of the pre-distorted image portion obtained from the image portions 354. The pixels along a right edge of the pre-distorted image portion obtained from the image portions 353 are placed next to the pixels along a left edge of the pre-distorted image portion obtained from the image portions 354.

At step 450, the pre-distorted image can be further processed, by a processor, to produce a processed image for projection. For example, the pre-distorted image can be sent from the apparatus 190 to the processor 176 of the display device 110 for further processing to produce control signals for projecting the pre-distorted image by the display device 110. At step 460, light from one or more light sources is modulated, by a light modulator, to project the processed image and display an image with reduced distortion based on the pre-distorted image. Accordingly, the image distortion in the displayed image is canceled or reduced. For example, the light modulator 140, such as an SLM, PLM, or LCoS device, can modulate according to control signals from the controllers 170, the incident light 150 from the one or more light sources 160 to project the modulated light 120 and display the processed image on the image projection surface 130.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described structure, device, or apparatus. For example, an apparatus described as including one or more devices (such as PLMs, FLCs or light sources), one or more optical elements (such as lenses), and/or one or more electronic components (such as controllers, processors, or memories) may instead have at least some of the components integrated into a single component which is adapted to be coupled to the remaining components either at a time of manufacture or after a time of manufacture, for example, by an end-user and/or a third-party.

While certain components may be described herein as being of a particular process technology, these components may be exchanged for components of other process technologies. Devices described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

What is claimed is:

1. An apparatus, comprising:
a parser configured to:
   receive a source image at a first input;
   receive a first clock signal having a first clock rate at a second input;
   partition, according to the first clock rate, the source image into image portions according to a pre-distortion geometry for the source image; and
   provide the image portions of the source image at respective first outputs;
warping engines coupled to the respective first outputs, wherein the warping engines are configured to:
   receive the image portions at respective third inputs;
   receive a second clock signal having a second clock rate at respective fourth inputs;
   warp, according to the second clock rate, the image portions separately to produce respective pre-distorted image portions based on the pre-distortion geometry for the source image; and
   provide the pre-distorted image portions of the image portions at respective second outputs; and
a combiner coupled to the second outputs, wherein the combiner is configured to:
   receive the pre-distorted image portions at respective fifth inputs;
   receive the first clock signal at a sixth input;
   combine, according to the first clock rate, the pre-distorted image portions to form a pre-distorted image of the source image; and
   provide the pre-distorted image at a third output.

2. The apparatus of claim 1, wherein the parser is configured to:
decimate the source image to produce a decimated image according to the pre-distortion geometry, wherein the decimated image has a smaller size in pixels than the source image; and
partition the decimated image into the image portions.

3. The apparatus of claim 1, wherein the warping engines are configured to warp the image portions concurrently to produce the pre-distorted image portions.

4. The apparatus of claim 1, wherein the pre-distortion geometry is based on an off-axis projection angle for the pre-distorted image, a surface geometry of an image projection surface for displaying the source image, or optics for projecting and displaying the source image.

5. The apparatus of claim 1, wherein the image portions have an equal size in pixels.

6. The apparatus of claim 1, wherein the second clock rate is less than the first clock rate by an order equal to a number of the warping engines.

7. The apparatus of claim 1, wherein the parser, the warping engines, and the combiner are electronic chips.

8. The apparatus of claim 1, wherein the apparatus includes N warping engines, wherein the source image is partitioned into N image portions that have a total size approximately equal to the source image, and wherein N is an integer number.

9. The apparatus of claim 8, wherein the first clock rate is X gigahertz, and wherein the second clock rate is X/N gigahertz, and wherein X is a positive number.

10. A method comprising:
decimating, by a parser, a source image to produce a decimated image according to a pre-distortion geometry for the source image;
partitioning, by the parser, the decimated image into image portions;
pre-distorting the image portions by respective warping engines to produce respective pre-distorted image portions according to the pre-distortion geometry for the source image;
combining, by a combiner, the pre-distorted image portions to produce a pre-distorted image;
processing, by a processor, the pre-distorted image to produce a processed image for projection; and
modulating, by a light modulator, light from one or more light sources to project the processed image.

11. The method of claim 10, wherein the image portions include pixels of the decimated image that overlap between the image portions.

12. The method of claim 10, wherein each image portion is pre-distorted by a respective warping engine separately from the other warping engines and independently of pixels in the other image portions.

13. The method of claim 10, wherein the image portions are pre-distorted by the respective warping engines by an inverse distortion transform function.

14. The method of claim 10, wherein decimating the source image includes:
performing a vertical decimation to reduce a vertical dimension of the source image; and
performing a horizontal decimation to reduce a horizontal dimension of the source image, wherein the vertical decimation and the horizontal decimation are separate decimation steps.

15. The method of claim 14, further comprising:
obtaining, for each image portion, a percentage in height observed according to the pre-distortion geometry;
calculating a vertical decimation factor based on the percentage in height observed for each image portion;
obtaining a minimum vertical decimation factor for the image portions; and
performing the vertical decimation of the source image based on the minimum vertical decimation factor.

16. The method of claim 14, further comprising:
obtaining, for each image portion, a percentage in width observed according to the pre-distortion geometry;
calculating a horizontal decimation factor based on the percentage in width observed for each image portion;
obtaining a smallest horizontal decimation factor for the image portions; and
performing the horizontal decimation of the source image based on the smallest horizontal decimation factor.

17. The method of claim 10, wherein the image portions are quadrants, square patches, rectangle patches, vertical stripes, or horizontal stripes of the decimated image.

18. A device, comprising:
an apparatus comprising:
   a parser configured to:
      decimate a source image to produce a decimated image according to a pre-distortion geometry for the source image; and
      partition the decimated image into image portions;
   warping engines coupled to the parser, wherein the warping engines are configured to pre-distort the image portions to produce respective pre-distorted image portions according to the pre-distortion geometry; and
   a combiner coupled to the warping engines, wherein the combiner is configured to combine the pre-distorted image portions to produce a pre-distorted image;
a processor configured to process the pre-distorted image to produce a processed image for projection;

one or more light sources coupled to the processor, wherein the one or more light sources are configured to transmit incident light; and a light modulator coupled to the processor and optically coupled to the one or more light sources, wherein the light modulator is configured to modulate the incident light to project a modulate light according to the processed image.

19. The device of claim 18, wherein the pre-distorted image is smaller in size than an image area of projection of the light modulator.

20. The device of claim 18, wherein the light modulator is a spatial light modulator (SLM), a phase light modulator (PLM), a liquid crystal on silicon (LCoS) device, or micro-light emitting diodes (micro-LEDs).

* * * * *